(12) United States Patent
Takamura et al.

(10) Patent No.: US 7,997,242 B2
(45) Date of Patent: Aug. 16, 2011

(54) SPRING RETAINER AND SPRING SYSTEM

(75) Inventors: Noritoshi Takamura, Aikoh-gun (JP); Hironobu Imaizumi, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 352 days.

(21) Appl. No.: 12/227,345

(22) PCT Filed: May 8, 2007

(86) PCT No.: PCT/JP2007/059495
§ 371 (c)(1),
(2), (4) Date: Nov. 14, 2008

(87) PCT Pub. No.: WO2007/132696
PCT Pub. Date: Nov. 22, 2007

(65) Prior Publication Data
US 2009/0235882 A1 Sep. 24, 2009

(30) Foreign Application Priority Data
May 16, 2006 (JP) ................................. 2006-136569

(51) Int. Cl.
*F01L 1/32* (2006.01)
(52) U.S. Cl. ......... 123/90.3; 74/88; 251/337; 123/90.67
(58) Field of Classification Search ............... 123/188.1, 123/188.2, 90.65, 90.66, 90.67, 90.3, 90.28; 74/88; 251/337
See application file for complete search history.

(56) References Cited

U.S. PATENT DOCUMENTS

| | | | | |
|---|---|---|---|---|
| 2,582,060 A | * | 1/1952 | Newton | 123/90.3 |
| 3,068,848 A | * | 12/1962 | Knocke | 123/90.3 |
| 3,537,325 A | * | 11/1970 | Orent | 74/88 |
| 3,563,218 A | * | 2/1971 | Havens | 123/90.67 |
| 3,717,132 A | * | 2/1973 | Slooten | 123/90.3 |
| 4,075,987 A | * | 2/1978 | Tauschek et al. | 123/90.3 |
| 4,538,558 A | * | 9/1985 | Updike et al. | 123/90.3 |
| 2009/0235882 A1 | * | 9/2009 | Takamura et al. | 123/90.3 |

FOREIGN PATENT DOCUMENTS

| | | |
|---|---|---|
| JP | 61-041029 | 2/1986 |
| JP | 63-042810 | 3/1988 |
| JP | 2-134430 | 5/1990 |
| JP | 8-319942 | 12/1996 |
| JP | 9-303455 | 11/1997 |
| JP | 9-329155 | 12/1997 |
| JP | 2001-140980 | 5/2001 |
| JP | 2001-513183 | 8/2001 |

* cited by examiner

*Primary Examiner* — Thomas E Denion
*Assistant Examiner* — Daniel A Bernstein
(74) *Attorney, Agent, or Firm* — Jordan and Hamburg LLP

(57) ABSTRACT

A spring retainer can reduce the set height and mass of a coil spring. The spring retainer has a retainer body attached to a stem end of a valve and a circumferential plate-like spring part having an inner circumferential part supported by the retainer body and resiliently supporting an end of the valve spring. A spring constant of the plate-like spring part is made higher than a spring constant of the valve spring, so that the plate-like spring part deflects after the valve spring is compressed, to provide a two-step load characteristic and reduce the set height, compressed height, and mass of the valve spring. It can also reduce the height and mass of the spring retainer. A spring system formed by combining the spring retainer and valve spring with each other will be compact and lightweight.

20 Claims, 5 Drawing Sheets

[Fig. 1]
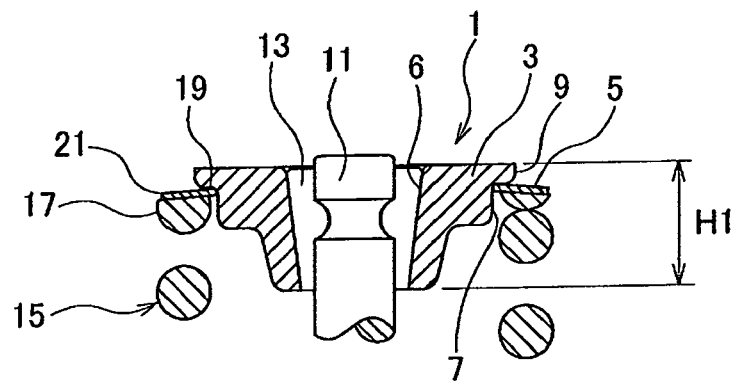
[Fig. 2]
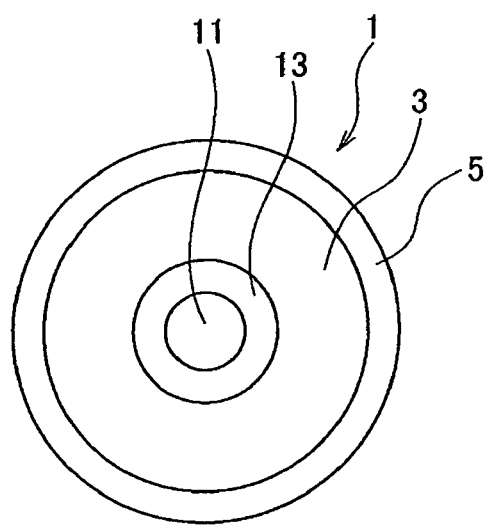
[Fig. 3]
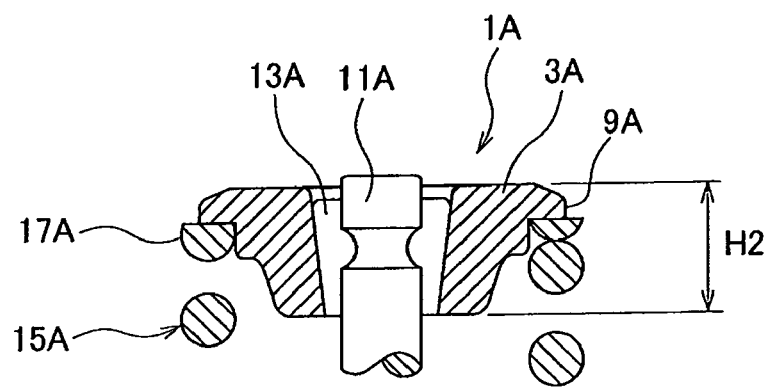

[Fig. 4]
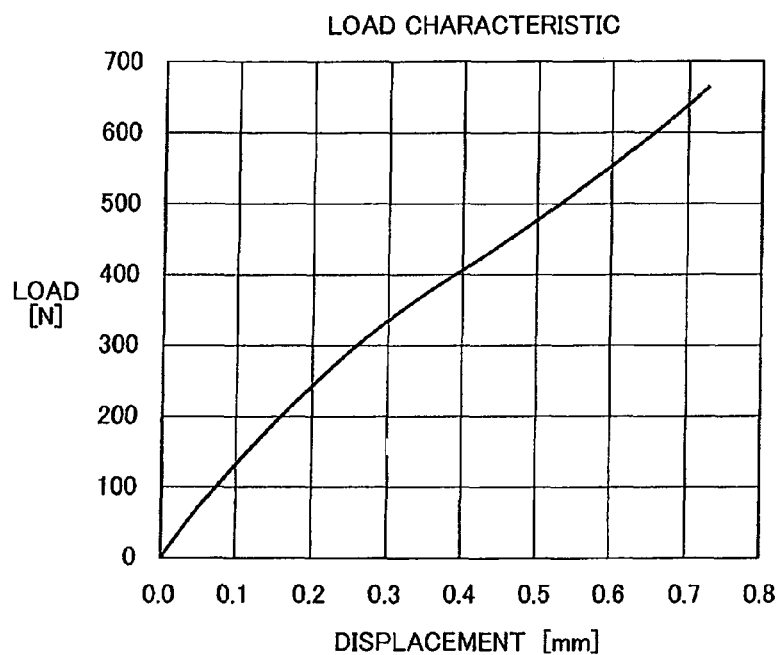
[Fig. 5]
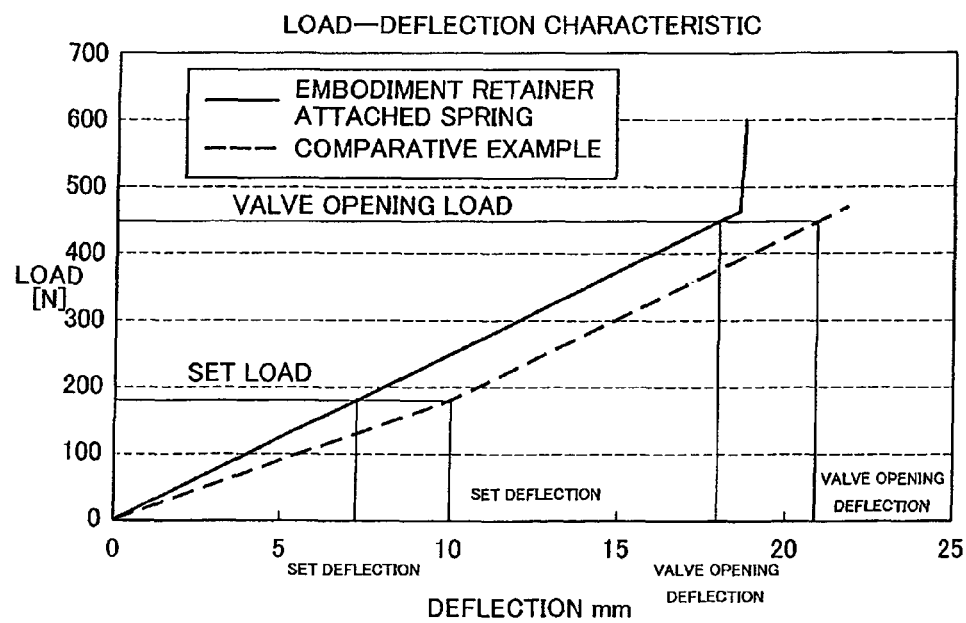

[Fig. 6]

|  |  | STANDARD SPRING | | SPRING SET WITH EMBODIMENT RETAINER | | |
|---|---|---|---|---|---|---|
|  |  | (1) | (2) | (5) | (3) | (4) |
|  |  | DUAL PITCH SPRING | EQUAL PITCH SPRING | DUAL PITCH SPRING | EQUAL PITCH SPRING | EQUAL PITCH SPRING |
| SPEC. | WIRE DIAMETER, mm | 3.2 | 3.2 | 3.2 | 3.2 | 3.1 |
| | COIL INNER DIAMETER mm | 17.0 | 17.0 | 17.0 | 17.0 | 17.0 |
| | TOTAL NUMBER OF TURNS | 8.90 | 7.20 | 8.70 | 7.00 | 6.50 |
| | NUMBER OF DAMPER TURNS | 1.70 | 0.00 | 1.70 | 0.00 | 0.00 |
| | COMPRESSED HEIGHT | 27.8 | 22.4 | 27.2 | 21.8 | 19.5 |
| | Lift, mm | 11.0 | 11.0 | 10.65 | 10.65 | 10.65 |
| | HEIGHT, mm SET | 40.00 | 34.50 | 39.05 | 33.60 | 31.30 |
| | HEIGHT, mm VALVE OPEN | 29.00 | 23.50 | 28.40 | 22.95 | 20.65 |
| | LOAD, N SET | 180 | 180 | 180 | 180 | 180 |
| | LOAD, N VALVE OPEN | 445 | 445 | 445 | 445 | 445 |
| | STRESS, MPa SET | 350 | 350 | 350 | 350 | 381 |
| | STRESS, MPa VALVE OPEN | 865 | 865 | 865 | 865 | 942 |
| | MASS, gr | 33.8 | 27.0 | 33.1 | 26.3 | 22.5 |

[Fig. 7]

DYNAMIC STRESS COMPARISON AT HIGH ROTATION SPEED  UNIT : MPa

|  |  | VALVE SPRING WITH CLOSELY-COILED PART | EMBODIMENT-RETAINER-ATTACHED VALVE SPRING | | |
|---|---|---|---|---|---|
|  |  | (1) | (5) | (3) | (4) |
| STATIC STRESS | MAX. STRESS | 865 | 865 | 865 | 942 |
| | STRESS AMPLITUDE | 257.5 | 257.5 | 257.5 | 285.5 |
| DYNAMIC STRESS 6000rpm | MAX. STRESS | 994.8 | 925.6 | 951.5 | 998.5 |
| | STRESS AMPLITUDE | 412.0 | 342.5 | 368.2 | 396.8 |

[Fig. 8]

MASS  UNIT : g

|  | (1) | (5) | (3) | (4) |
|---|---|---|---|---|
| RETAINER (SUPPORT MEMBER) | 5.8 | 4.2 | 4.5 | 4.5 |
| DISK SPRING | 0 | 0.9 | 0.9 | 0.9 |
| VALVE SPRING | 33.8 | 33.1 | 26.3 | 22.5 |
| Total | 39.6 | 38.2 | 31.7 | 27.9 |

[Fig. 9]
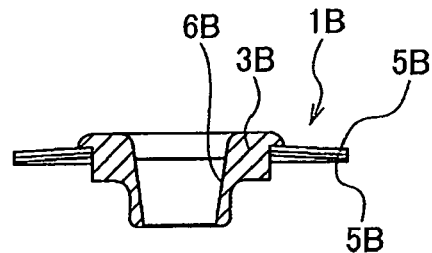
[Fig. 10]
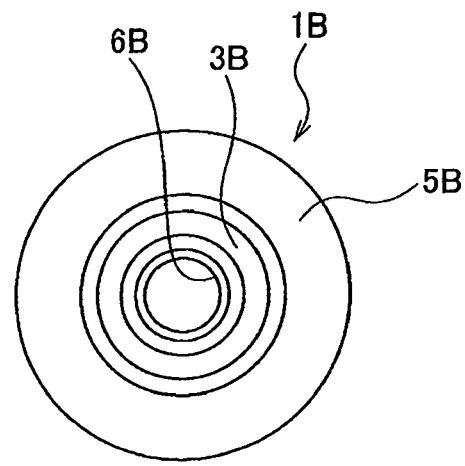
[Fig. 11]
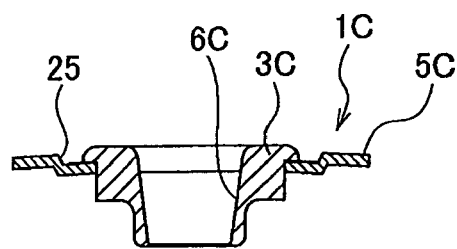
[Fig. 12]
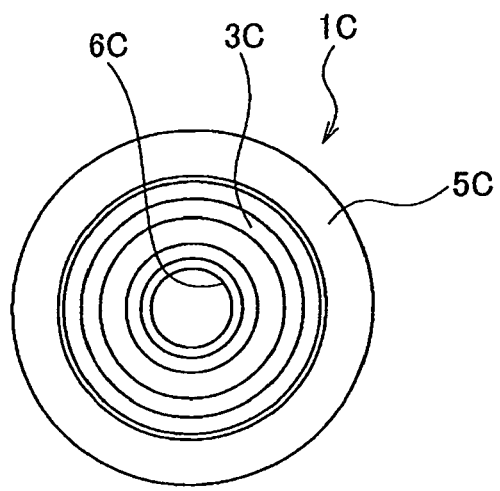

[Fig. 13]
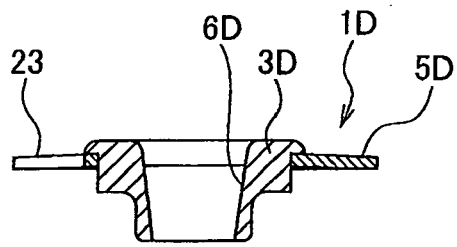
[Fig. 14]
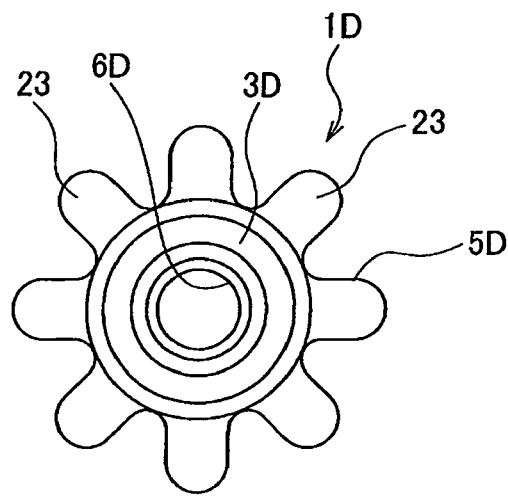
[Fig. 15]
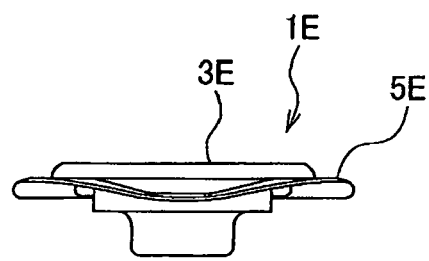
[Fig. 16]
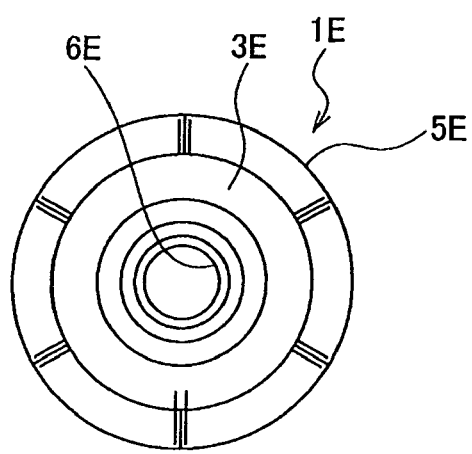

SPRING RETAINER AND SPRING SYSTEM

BACKGROUND OF THE INVENTION

1. Field of the Invention

The present invention relates to a spring retainer used to support a coil spring such as a valve spring and to a spring system incorporating a coil spring.

2. Description of Related Art

Among spring retainers used to support valve springs, Patent Document 1 shows a configuration that supports a valve spring with double springs.

This technique relates to a valve rotator for an internal combustion engine with a rotator body having a disc spring and a coil spring which is a circumferential garter spring. The garter spring is received in a groove of the rotator body and is in contact with a top surface of the disk spring. A bottom surface of the disk spring contacts and supports the valve spring.

When the disk spring upwardly deflects, it pushes and inclines the garter spring in a circumferential direction. According to the inclination, the rotator body turns around a valve axis to forcibly turn the valve.

According to such a structure, however, the disk spring and garter spring must have lower spring constants than the valve spring. This results in lowering an overall spring constant to limit reductions of the set height and mass of the valve spring.

Patent Document 1: Japanese Unexamined Patent Application Publication No. H08-180308

SUMMARY OF THE INVENTION

A problem to be solved is the limit on reductions of the set height and mass of a coil spring.

To reduce the set height and mass of a coil spring, the present invention is most characterized by a plate-like spring part having an inner circumferential part supported by a retainer body and resiliently supporting an end of the coil spring, and a spring constant of the plate-like spring part is higher than a spring constant of the coil spring.

A spring retainer according to the present invention has the plate-like spring part having an inner circumferential part supported by the retainer body and resiliently supporting an end of the coil spring, and the spring constant of the plate-like spring part being higher than the spring constant of the coil spring. After the coil spring is compressed, the plate-like spring part deflects. Due to the deflection of the plate-like spring part, a set height and a compressed height can be suppressed and a mass can be reduced.

BRIEF DESCRIPTION OF THE DRAWINGS

FIG. 1 is a sectional view showing an essential part of a spring system with a valve spring in a set state according to Embodiment 1 of the present invention;

FIG. 2 is a plan view showing the spring system with the valve spring in the set state according to Embodiment 1 of the present invention;

FIG. 3 is a sectional view showing an essential part of a spring system with a valve spring in a set state according to comparative example;

FIG. 4 is a graph showing a load-deflection characteristic of a plate-like spring part according to Embodiment 1 of the present invention;

FIG. 5 is a graph showing load-deflection characteristics with the valve springs in the set states according to Embodiment 1 of the present invention;

FIG. 6 is a table comparing set heights of valve springs and the like;

FIG. 7 is a table comparing dynamic stress;

FIG. 8 is a table comparing mass;

FIG. 9 is a sectional view showing a spring retainer according to Embodiment 2 of the present invention;

FIG. 10 is a plan view showing the spring retainer according to Embodiment 2 of the present invention;

FIG. 11 is a sectional view showing a spring retainer according to Embodiment 3 of the present invention;

FIG. 12 is a plan view showing the spring retainer according to Embodiment 3 of the present invention;

FIG. 13 is a sectional view showing a spring retainer according to Embodiment 4 of the present invention;

FIG. 14 is a plan view showing the spring retainer according to Embodiment 4 of the present invention;

FIG. 15 is a side view showing a spring retainer according to Embodiment 5 of the present invention; and FIG. 16 is a plan view showing the spring retainer according to Embodiment 5 of the present invention.

DETAILED DESCRIPTION OF EMBODIMENTS

An object of further reducing the set height and mass of a coil spring is achieved by the plate-like spring part whose spring constant is larger than that of the coil spring.

FIG. 1 is a sectional view showing an essential part of a spring system in which a valve spring is set with the use of a spring retainer according to Embodiment 1 of the present invention and FIG. 2 is a plan view showing the same.

As shown in FIGS. 1 and 2, the spring retainer 1 has a retainer body 3 and a circumferential plate-like spring part 5.

The retainer body 3 is made of titanium alloy, aluminum alloy, or the like. An inner circumference of the retainer body 3 is provided with a tapered hole 6 and an outer circumference thereof is provided with a fitting part 7 and a collar 9 that are formed in steps. The retainer body 3 is attached through a cotter 13 to a stem end 11 of a valve.

The plate-like spring part 5 is a disk spring that resiliently supports an end 17 of a valve spring 15 which is a coil spring. The plate-like spring part 5 has an inner circumferential part 19 and an outer circumferential part 21 that is inclined toward the valve spring 15 relative to the inner circumferential part 19. The inner circumferential part 19 of the plate-like spring part 5 is press-fitted and fixed to the fitting part 7 of the retainer body 3 and the outer circumferential part 21 thereof radially outwardly protrudes from the collar 9 and is supported so that it can be inverted in a valve stem axis direction.

Spring constants are so set that a spring load of the plate-like spring part 5 is higher than a spring load of the valve spring 15. Namely, the spring constant K1 of the plate-like spring part 5 is set to be higher than the spring constant K2 of the valve spring 15, i.e., K1>K2.

Accordingly, in this embodiment, until the valve spring 15 is entirely weighed into a compressed state, the plate-like spring part 5 slightly deflects according to a load and supports the valve spring 15. When the valve spring 15 is entirely weighed into a compressed state, the plate-like spring part 5 starts to further deflect, to provide a two-step load characteristic. With the two-step load characteristic achieved with the plate-like spring part 5, a surge may effectively be suppressed without a closely-coiled part.

As mentioned above, the plate-like spring part 5 is able to invert due to a load from the valve spring 15, thereby realizing a wide deflecting range.

FIG. 3 is a sectional view showing an essential part of a spring system in which a valve spring is set with the use of a spring retainer according to a comparative example. Structural parts corresponding to those of FIG. 1 are explained with like reference marks plus A. The spring retainer 1A is made of titanium alloy, aluminum alloy, or the like. A collar 9A directly supports an end 17A of a valve spring 15A. The valve spring 15A provides a two-step load characteristic with, for example, a closely-coiled part.

According to the comparative example of FIG. 3, a load of the valve spring 15A is applied to an outer circumferential edge of the collar 9A. On the other hand, the embodiment of the present invention of FIG. 1 applies a load of the valve spring 15 through the plate-like spring part 5 to a base of the collar 9. Namely, the collars 9 and 9A have different points where bending moment acts. Due to this, the height H1 of the retainer body 3 of the embodiment shown in FIG. 1 can be reduced lower than the height H2 of the spring retainer 1A of the comparative example shown in FIG. 3. The embodiment, therefore, can reduce the weight and height of the retainer.

FIG. 4 is a graph showing a load-deflection characteristic of the plate-like spring part. In FIG. 4, an abscissa indicates displacement in mm and an ordinate indicates load in N.

The plate-like spring part 5 has dimensions of, for example, 23 mm in outer diameter, 17 mm in inner diameter, and 0.6 mm in plate thickness. When the plate-like spring part 5 receives a valve set load (set load) of 180 N, a deflection of 0.14 mm occurs as shown in FIG. 4. With respect to a valve opening load of 445 N, a slight deflection of 0.45 mm occurs.

With the plate-like spring part 5, the valve spring 15 is set as shown in FIG. 1. The two-step load characteristic is realized without a closely-coiled part with the valve spring 15 having equal pitches.

FIG. 5 is a graph showing load-deflection characteristics each with a valve spring being in a set state. Namely, there are shown a characteristic (continuous line in FIG. 5) representing the spring system employing the spring retainer 1 of the embodiment of the present invention and the valve spring 15 and a characteristic (dotted line in FIG. 5) representing the configuration of FIG. 3 of the comparative example employing the valve spring having a closely-coiled part.

As shown in FIG. 5, the plate-like spring part 5 according to the embodiment of the present invention involves the deflection thereof and reduces the deflection of the valve spring compared with the comparative example when a set load of 180 N or a valve opening load of 445 N is applied. When the valve spring 15 is brought into a compressed state, the plate-like spring part 5 generates a large load with a small deflection, to thereby provide the two-step load characteristic.

FIG. 6 is a table showing comparison of the set heights and the like of valve springs among standard springs and springs with the retainers of the embodiment. (1) and (2) relate to the standard springs and (3) to (5) relate to the springs with the retainers of the embodiment. (1) employs a valve spring having 3.2 mm in wire diameter, 17.0 mm in coil inner diameter, and 1.70 in the number of damper turns. (2) employs a valve spring having 3.2 mm in wire diameter, 17.0 mm in coil inner diameter, and equal pitches with 0 in the number of damper turns. (3) employs the embodiment of the present invention having 3.2 mm in wire diameter, 17.0 mm in coil inner diameter, and 0 in the number of damper turns. (4) employs the embodiment of the present invention having 3.1 mm in wire diameter, 17.0 mm in coil inner diameter, and 0 in the number of damper turns. (5) employs a valve spring having 3.2 mm in wire diameter, 17.0 mm in coil inner diameter, and 1.70 in the number of damper turns.

As is apparent from FIG. 6, the height of the valve spring 15 of each of (3) and (4) according to the embodiment is lower than that of the equal-pitch standard valve spring (2) under a set load of 180 N and a valve opening load of 445 N. Namely, each of (3) and (4) can reduce the height. Similar comparison shows that each can reduce the height of a compressed state. According to (5) of the embodiment, the height of the valve spring under a set load of 180 N and a valve opening load of 445 N is lower than the height of the valve spring (1) having a closely-coiled part. Namely, it can reduce the height. Similar comparison shows that it can reduce the height of a compressed state.

FIG. 7 is a table showing comparison of dynamic stress. (1), (3), (4), and (5) of FIG. 7 correspond to (1), (3), (4), and (5) of FIG. 6.

As shown in FIG. 7, at a high engine rotation speed of 6000 rpm, a stress amplitude under a maximum stress is small to improve dynamic stress. This realizes high-stress design like (3), (4), and (5) to achieve lightness and compactness.

FIG. 8 is a table showing comparison of mass. (1), (3), (4), and (5) of FIG. 8 correspond to (1), (3), (4), and (5) of FIG. 6.

As shown in FIG. 8, the valve spring 15 with the spring retainer 1 according to the embodiment may increase the mass thereof by the mass of the plate-like spring part 5. However, spring load produced by the plate-like spring part 5 helps to reduce the height and mass of the valve spring 15.

As is apparent from comparison with FIG. 3, reducing the height H1 of the spring retainer 1 lower than the height H2 of the spring retainer 1A results in reducing the mass of the spring retainer 1, as well.

As a whole, (3), (4), and (5) of the embodiment each can realize lightness compared with the example (1) having a closely-coiled part.

Embodiment 1 of the present invention employs the retainer body 3 attached to the stem end 11 of a valve and the circumferential plate-like spring part 5 having the inner circumferential part 19 supported by the retainer body 3 and resiliently supporting the end 17 of the valve spring 15. The spring constant K1 of the plate-like spring part 5 is higher than the spring constant K2 of the valve spring 15, so that the plate-like spring part 5 deflects after the valve spring 15 is compressed, to provide the two-step load characteristic.

This suppresses the set height and compressed height of the valve spring 15 and reduces the mass thereof. Also, the height and mass of the spring retainer 1 can be reduced. Consequently, a spring system constituted by combining the spring retainer 1 with the valve spring 15 will be compact and lightweight.

The plate-like spring part 5 is supported so that it can invert. This increases a deflection stroke of the plate-like spring part 5, to further reduce the height and mass of the valve spring 15 and those of an entire spring system.

The spring retainer 1A of FIG. 3 supporting a valve spring having a closely-coiled part may provide the two-step load characteristic to effectively suppress a surge. This, however, puts a limit on an increase in a spring constant for a valve opening action, thereby limiting the surge suppressing effect.

On the other hand, the plate-like spring part 5 deflects after the valve spring 15 is compressed, to provide the two-step load characteristic. This improves a spring load produced after the valve spring 15 is compressed, thereby effectively suppressing a surge.

If the valve spring 15 has a closely-coiled part, it will provide a damping effect achieved when the closely-coiled part is compressed, as well as a damping effect achieved when the spring is entirely compressed. This configuration further improves the dynamic stress reducing effect.

FIGS. 9 and 10 relate to Embodiment 2 of the present invention, in which FIG. 9 is a sectional view showing a spring retainer and FIG. 10 is a plan view showing the same.

The spring retainer 1B according to this embodiment supports a plurality of plate-like spring parts 5B that are laid one on another.

This embodiment can set a load by selecting the number of the plate-like spring parts.

FIGS. 11 and 12 relate to Embodiment 3 of the present invention, in which FIG. 11 is a sectional view showing a spring retainer and FIG. 12 is a plan view showing the same.

The spring retainer 1C according to this embodiment employs a plate-like spring part 5C that is provided with inner and outer circumferential parts 19 and 21 between which there is a step part 25 in the sectional view.

This embodiment can further lower the position of a retainer body 3 by arranging the step part 25.

FIGS. 13 and 14 relate to Embodiment 4 of the present invention, in which FIG. 13 is a sectional view showing a spring retainer and FIG. 14 is a plan view showing the same.

The spring retainer 1D according to this embodiment employs a plate-like spring part 5D having support tongues 23 that are circumferentially arranged at regular intervals.

This embodiment can set a spring load by setting the number of the support tongues 23.

FIGS. 15 and 16 relate to Embodiment 5 of the present invention, in which FIG. 15 is a side view showing a spring retainer and FIG. 16 is a plan view showing the same.

The spring retainer 1E according to this embodiment employs a plate-like spring part 5E that is a wave spring.

This embodiment can set a spring load by setting waves of the plate-like spring part 5E.

Coil springs applicable to the present invention are not only valve springs but also clutch damper (torsion) springs and the like. In case of the clutch damper (torsion) spring, the plate-like spring part (disk spring) having a higher spring constant absorbs impact force (load) that is continuously applied after a coil spring is compressed, thereby preventing the deformation and destruction of the coil spring, as well as the destruction of a seat member (retainer).

The invention claimed is:

1. A spring retainer comprising:
   a retainer body attached to a stem end of a valve;
   a fitting part and a collar formed on an outer circumference of the retainer body, each of the fitting part and the collar comprising a stepped portion therebetween;
   a plate-like spring part having an inner circumferential part fixed to the fitting part of the retainer body and an outer circumferential part radially outwardly protruding from the collar so as to extend laterally from the collar periphery when viewed in cross-section, the plate-like spring part resiliently and directly supporting a movable end of a coil spring; and
   a spring constant of the plate-like spring part being made higher than a spring constant of the coil spring.

2. The spring retainer as set forth in claim 1, wherein:
   the plate-like spring part is supported so as to be able to invert.

3. The spring retainer as set forth in claim 1, wherein:
   the plate-like spring part comprises of a plurality of spring parts that are laid one on another and are supported.

4. The spring retainer as set forth in claim 1, wherein:
   the plate-like spring part is a disk spring.

5. The spring retainer as set forth in claim 1, wherein:
   the plate-like spring part has a step part between the inner and outer circumferential parts thereof.

6. The spring retainer as set forth in claim 1, wherein:
   the plate-like spring part has support tongues that are circumferentially arranged at regular intervals.

7. The spring retainer as set forth in claim 1, wherein:
   the plate-like spring part is a wave spring.

8. A spring system comprising the spring retainer as set forth in claim 1 and a coil spring combined with the spring retainer.

9. The spring retainer as set forth in claim 2, wherein:
   the plate-like spring part comprises of a plurality of spring parts that are laid one on another and are supported.

10. The spring retainer as set forth in claim 2, wherein:
    the plate-like spring part is a disk spring.

11. The spring retainer as set forth in claim 3, wherein:
    the plate-like spring part is a disk spring.

12. The spring retainer as set forth in claim 2, wherein:
    the plate-like spring part has a step part between the inner and outer circumferential parts thereof.

13. The spring retainer as set forth in claim 2, wherein:
    the plate-like spring part has support tongues that are circumferentially arranged at regular intervals.

14. The spring retainer as set forth in claim 2, wherein:
    the plate-like spring part is a wave spring.

15. A spring system comprising the spring retainer as set forth in claim 2 and a coil spring combined with the spring retainer.

16. A spring system comprising the spring retainer as set forth in claim 3 and a coil spring combined with the spring retainer.

17. A spring system comprising the spring retainer as set forth in claim 4 and a coil spring combined with the spring retainer.

18. A spring system comprising the spring retainer as set forth in claim 5 and a coil spring combined with the spring retainer.

19. A spring system comprising the spring retainer as set forth in claim 6 and a coil spring combined with the spring retainer.

20. A spring system comprising the spring retainer as set forth in claim 7 and a coil spring combined with the spring retainer.

* * * * *